United States Patent [19]

Clayton

[11] 4,311,182
[45] Jan. 19, 1982

[54] TIRE TREAD GROOVING APPARATUS AND METHOD

[75] Inventor: Andrew R. Clayton, Salisbury, N.C.

[73] Assignee: Brad Ragan, Inc., Spruce Pine, N.C.

[21] Appl. No.: 213,320

[22] Filed: Dec. 5, 1980

Related U.S. Application Data

[63] Continuation-in-part of Ser. No. 6,517, Jan. 25, 1979, Pat. No. 4,237,955.

[51] Int. Cl.³ ............................................. B29H 21/08
[52] U.S. Cl. ...................................................... 157/13
[58] Field of Search .................. 51/DIG. 33; 157/13; 156/96

[56] References Cited
U.S. PATENT DOCUMENTS 2,965,162 12/1960 Hawkinson ............................ 157/13
3,877,506 4/1975 Mattox et al. ......................... 157/13
4,116,256 9/1978 Morris et al. ......................... 157/13

Primary Examiner—James G. Smith
Attorney, Agent, or Firm—Bell, Seltzer, Park & Gibson

[57] ABSTRACT

An apparatus and method for grooving tires which is particularly useful for renewing previously used over-the-road tires and which removes a portion of a layer of rubber applied to a tread face of a carcass so as to form on the tread face a predetermined grooved tread design. Relative motion between a heated knife and a tire carcass is controlled and coordinated in such a manner as to form a particular selected tread pattern, while one of a plurality of knives of varying configurations is selected to form particular portions of the grooved design. As described more fully hereinafter, a programmable memory preferably in the form of a digital, electronic central processor unit controls the operation of components of the apparatus and is programmed to follow particular functional sequences.

13 Claims, 18 Drawing Figures

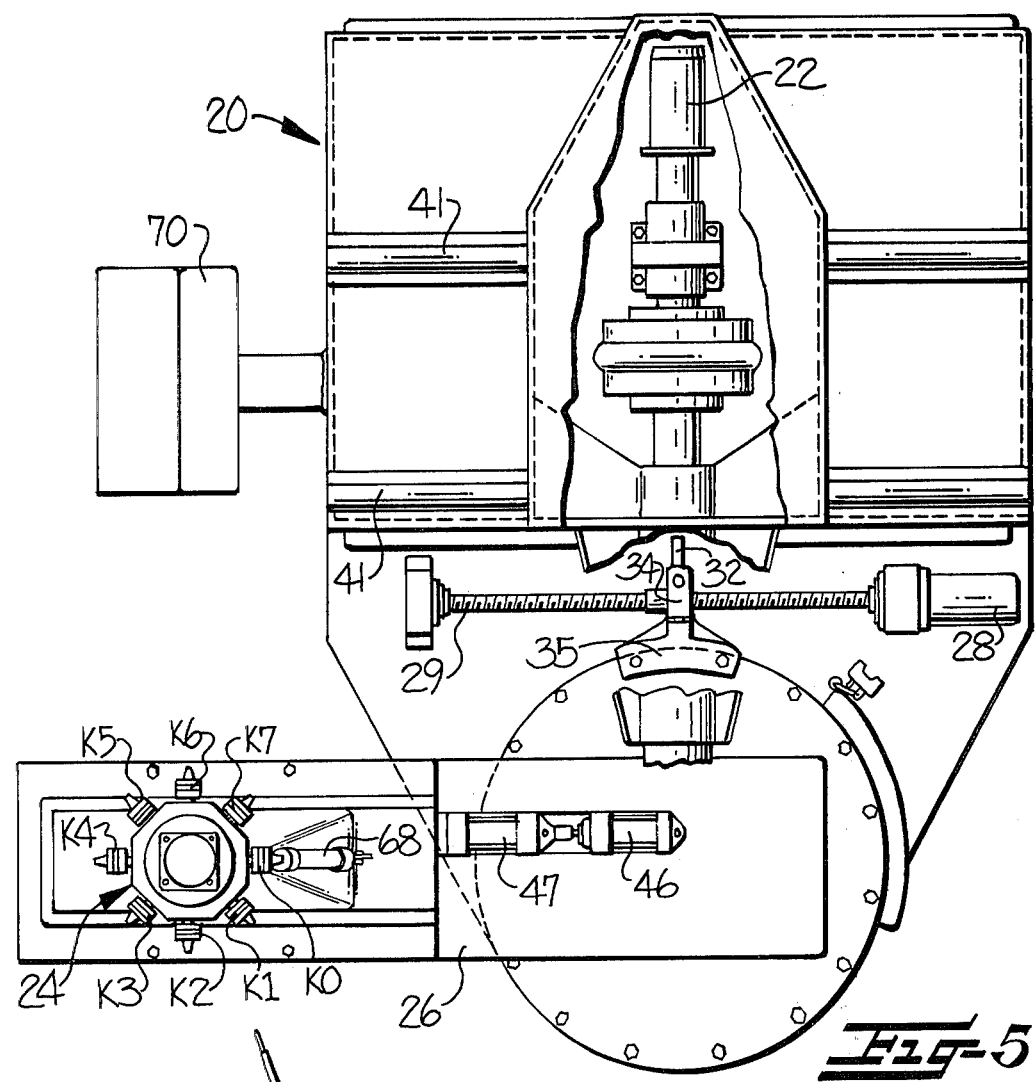
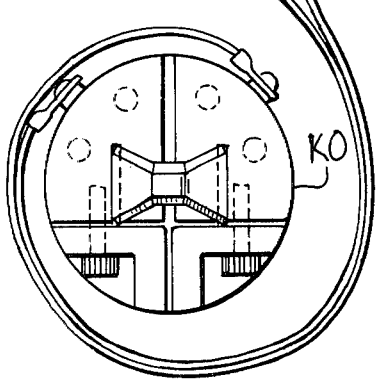
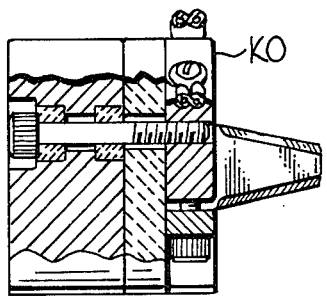

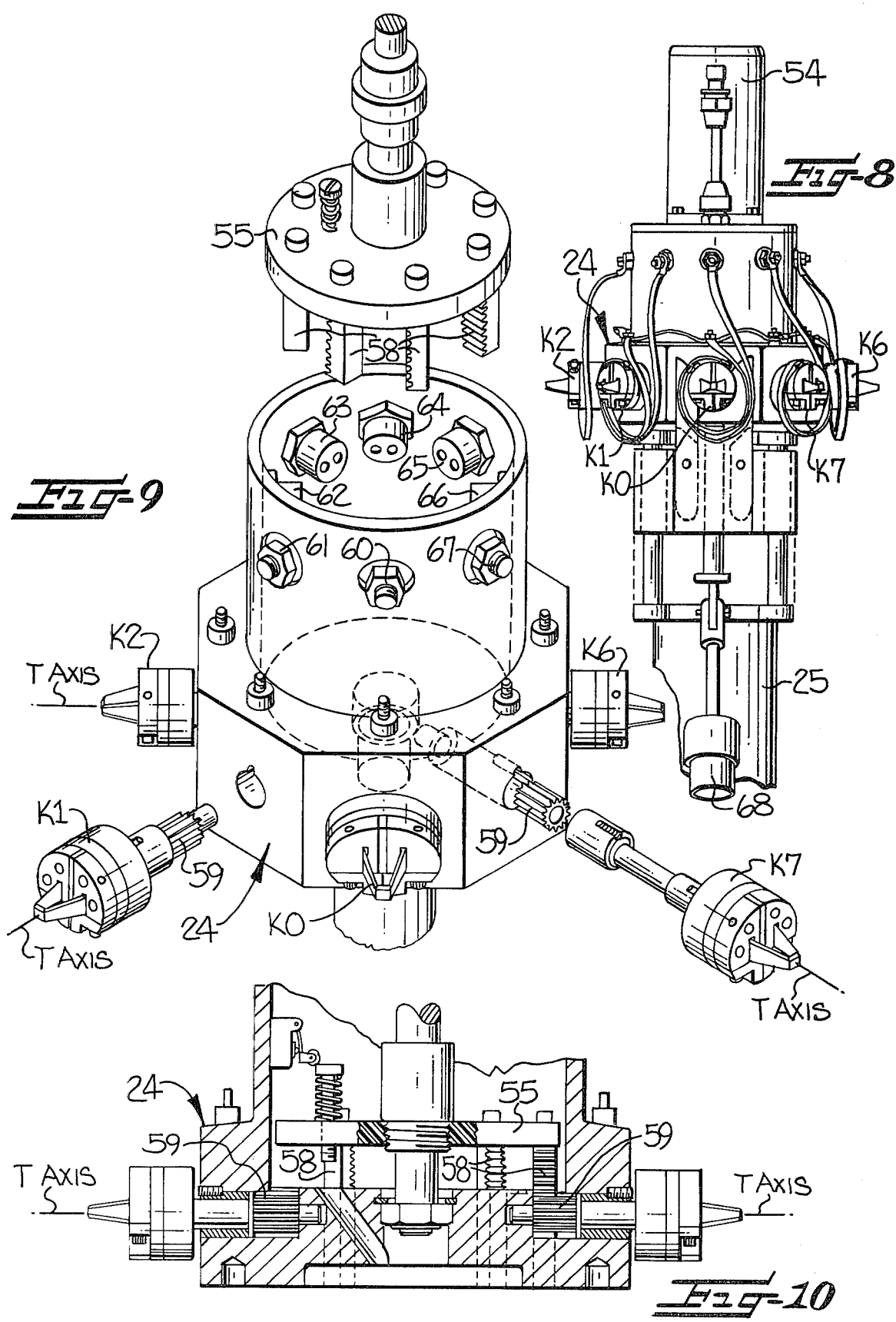

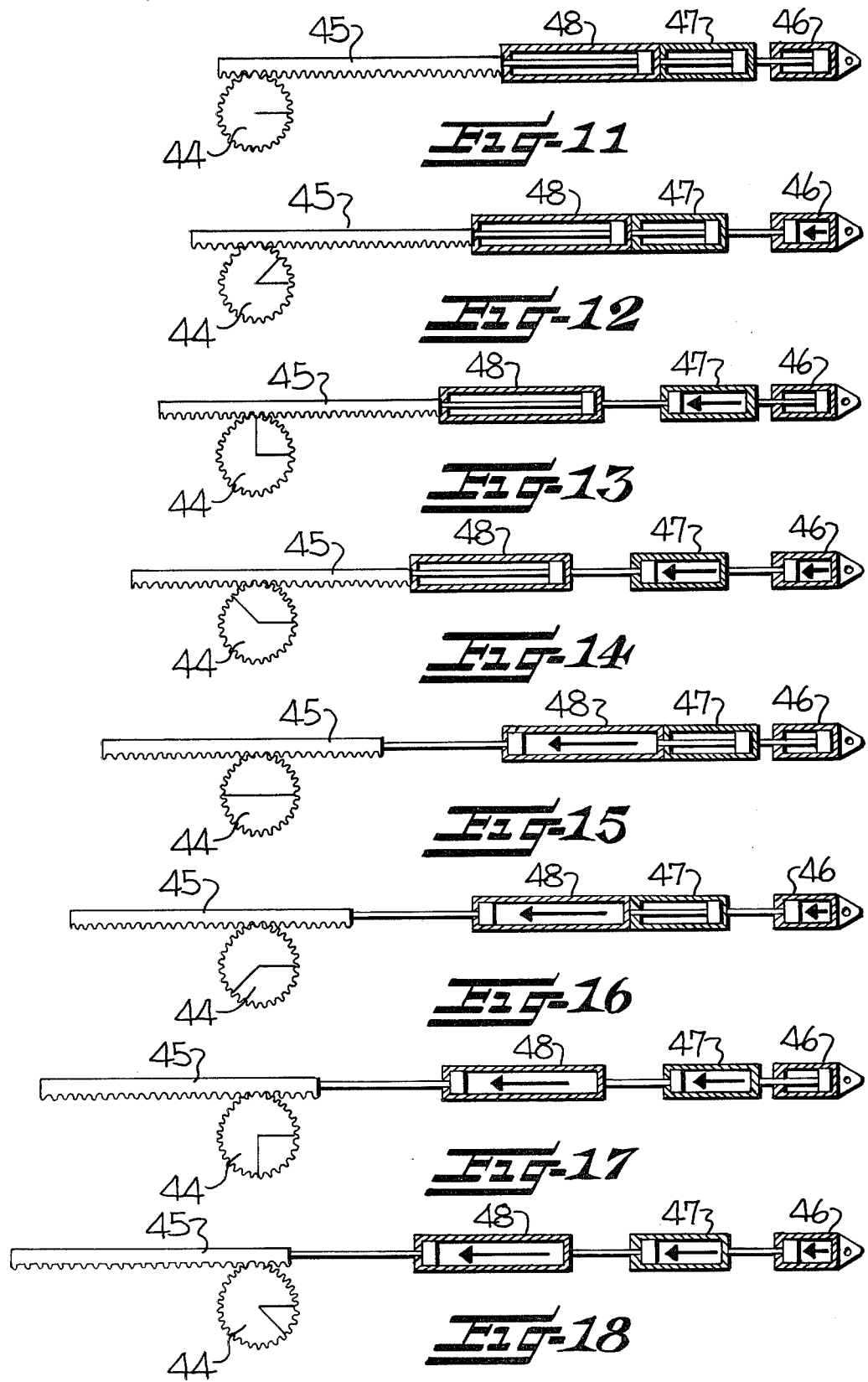

TIRE TREAD GROOVING APPARATUS AND METHOD

RELATED APPLICATION

This application is a continuation-in-part from co-pending application Ser. No. 006,517 filed Jan. 25, 1979 now U.S. Pat. No. 4,237,955.

FIELD AND BACKGROUND OF INVENTION

One general division among pneumatic tires for vehicles can be made between off-the-road tires and over-the-road tires. Off-the-road tires are conventionally used on construction vehicles and the like and methods and apparatus for the retreading, renewing or rebuilding of such tires have been developed as described in the aforementioned parent application. The same difficulties and deficiencies which have led to the development of techniques which have replaced mold curing for off-the-road tires are factors in the retreading, renewing or rebuilding of over-the-road tires and particularly of truck tires and the like. For the reasons generally outlined in those prior disclosures which relate to retreading, renewing and rebuilding without reliance upon mold curing, effort has been directed toward the development of such techniques for truck tires and the like.

One example of apparatus and methods which have been so developed is to be found in Barwell U.S. Pat. No. 3,808,076 which describes a method and apparatus for applying tread material in which tread material is extruded under pressure as a tread pattern is formed in the material. While tires retreaded, renewed or rebuilt in accordance with the Barwell disclosure have operated satisfactorily, the range of tread designs which may be achieved by the method and apparatus there disclosed is somewhat restricted and is more restricted than is desirable to users of such tires.

Prior to Barwell disclosure, it has been disclosed that tread designs may be formed in over-the-road tires by grooving techniques bearing some similarities to the grooving techniques described in the aforementioned parent application. However, such grooving techniques have been highly reliant upon the manual skill of an individual operator and have, even so, been somewhat restricted in the range of tread patterns which could be readily and economically produced.

BRIEF DESCRIPTION OF INVENTION

With the aforementioned development of the field of this invention in mind, it is an object of this invention to retread, renew or rebuild over-the-road tires by forming a predetermined grooved tread design in tread rubber applied to the tire through the use of an apparatus and in accordance with a method which provides wide flexibility in tread designs to be formed while accommodating ease of use. In realizing this object of the present invention, a plurality of grooving knives of a plurality of configurations are provided and selected ones of the knives are moved into engagement with the tread surface of the tire in accordance with a pattern stored in a programmable memory for forming a desired tread design.

Yet a further object of the present invention is to accomplish formation of a wide range of selected tread design configurations. In realizing this object of the present invention, the apparatus disclosed fully controls relative movement between a grooving knife and a tread surface on at least three axes.

Yet a further object to the present invention is to accomplish, in a method of forming a grooved tread design as generally described above, the formation of a tread design of any selected predetermined pattern. In realizing this object of the present invention, desired patterns are coded and stored in a programmable memory, with the code including information concerning repetitions of the various portions of the pattern. Thereafter, during processing of a given specific tire, the desired pattern is reproduced from the coded information and with a high degree of uniformity and repeatability.

BRIEF DESCRIPTION OF DRAWINGS

Some of the objects of the invention having been stated, other objects will appear as the description proceeds, when taken in connection with the accompanying drawings, in which

FIG. 5 is a plan view, partly broken away, of the apparatus of FIGS. 1 through 4;

FIG. 6 is an enlarged elevation view of a knife portion of the apparatus of FIGS. 1 through 5;

FIG. 7 is a side elevation view, partially in section, through the knife portion of FIG. 6;

FIG. 8 is an enlarged elevation view of a turret portion of the apparatus of FIGS. 1 through 5;

FIG. 9 is an exploded perspective view of portions of the turret apparatus of FIG. 8;

FIG. 10 is an elevation view, in section, through a portion of the turret apparatus of FIGS. 8 and 9; and FIGS. 11 through 18 are schematic views of an actuation mechanism for the turret apparatus, illustrating a sequence by which all knife positions are accessible.

DETAILED DESCRIPTION OF THE INVENTION

Figure 1:
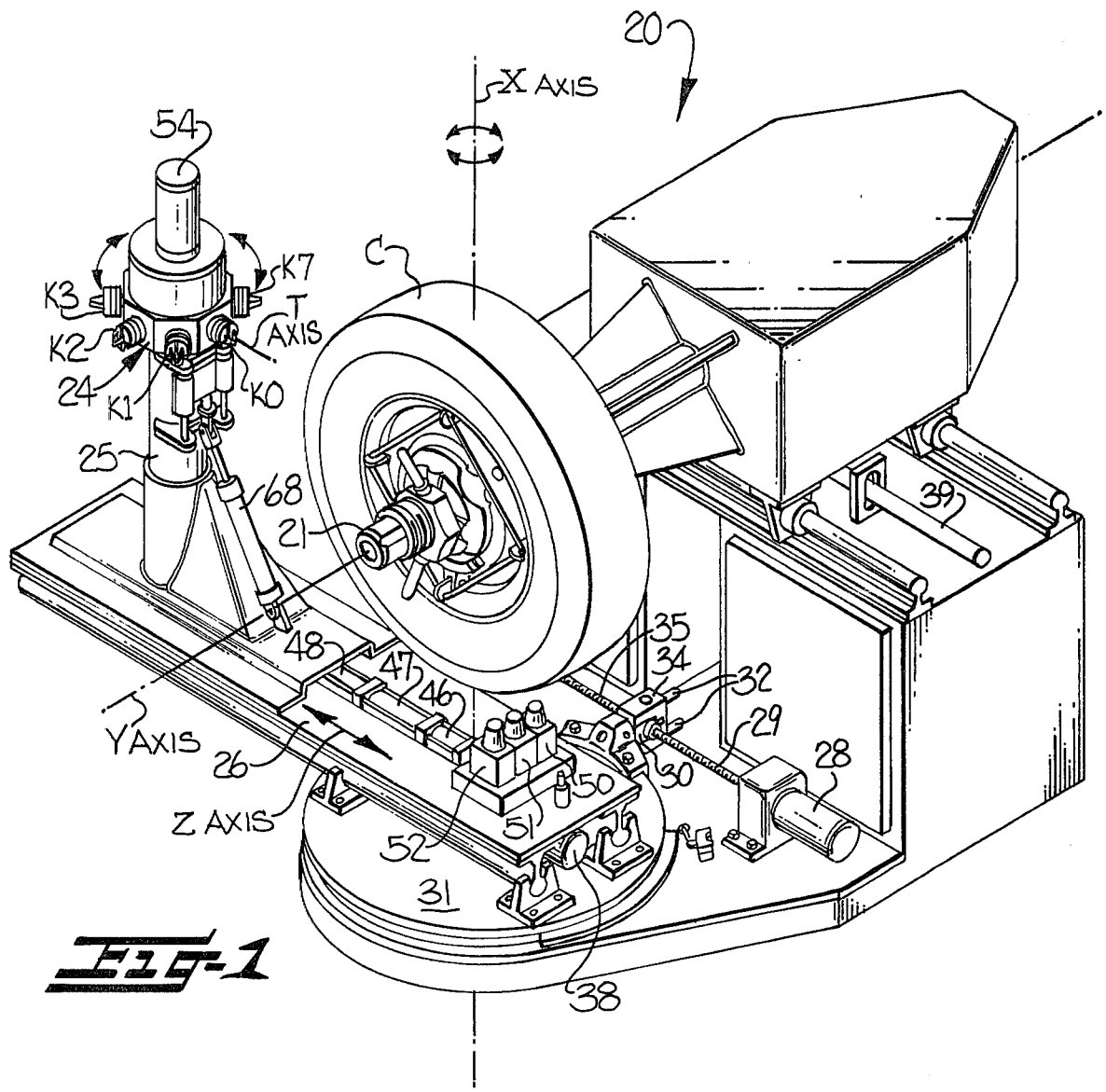
FIG. 1 is a perspective view of an apparatus embodying the present invention.

While the present invention will be described hereinafter with particular reference to the accompanying drawings, in which an operating embodiment of the apparatus of the present invention is shown, it is to be understood at the outset of the description which follows that it is contemplated that the invention may be modified in various ways while still achieving the beneficial results of this invention. Accordingly, the description which follows is to be understood as a broad teaching directed to persons skilled in the appropriate arts, and not as restrictive on the scope of this invention.

The apparatus of the present invention, generally indicated at 20, includes a tire mounting means for supporting a tire carcass C for rotation about a predetermined axis, herein referred to as the Y axis. As will be described more fully hereinafter, the tire mounting means includes a rotatable shaft 21, appropriate bearings mounting that shaft for rotation about the Y axis, and a stepping motor 22. By means of the stepping motor and as described more fully hereinafter, the tire C may be rotated about the Y axis coaxially with the shaft 22 and in incremental steps. For example, one revolution of the tire C might require 500,000 pulses to the stepping motor 22. Other ratios of pulses delivered to the stepping motor 22 and revolutions of the tire may readily be adopted, consistent with the use of a program for developing a tread design as described hereinafter.

The apparatus 20 additionally includes knife means for forming grooves in tread rubber previously applied to the tire carcass C. Particularly, the apparatus 20 includes a plurality of knives K0 through K7 having a plurality of configurations. That is, the particular width of an open area defined between the legs of a generally U-shaped knife and/or the nose contour of the knife may be varied so as to impart characteristic configurations to grooves formed by the respective knives.

Figure 2:
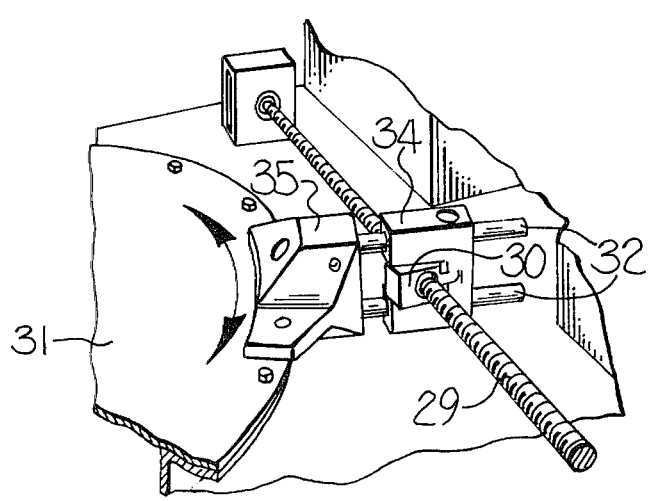
FIG. 2 is a perspective view of a portion of the apparatus of FIG. 1, illustrating mechanism which controls movement along one specific axis.

The knives are mounted in a means which accomplishes relative movement between the knives and the tread surface of the tire. In the particular form shown for the present invention, the knife mounting means comprises a turret generally indicated at 24. The turret 24 stands atop a standard 25 which is mounted upon a base plate 26 which is rotatable about a vertical axis herein referred to as the X axis. Rotation of the base plate 26 is accomplished by a stepping motor 28 driving a lead screw 29 which engages a threaded block 30 (FIG. 2) which is operatively connected with a rotatable table 31 carrying the base plate 26. The connection of the threaded block 30 with the turntable 31 is, in the form, illustrated, through a pair of projecting rods 32, a pivot block 34 slidable on the rods 32, and a torque block 35 from which the rods 32 project. As will be appreciated, rotation of the screw 29 by the stepping motor 28 will rotate the turntable 31 through predetermined arcuate movement about the X axis. As such movement occurs, one of the knives K0 through K7 may traverse the tread rubber adhered to the tire C.

Figure 3:
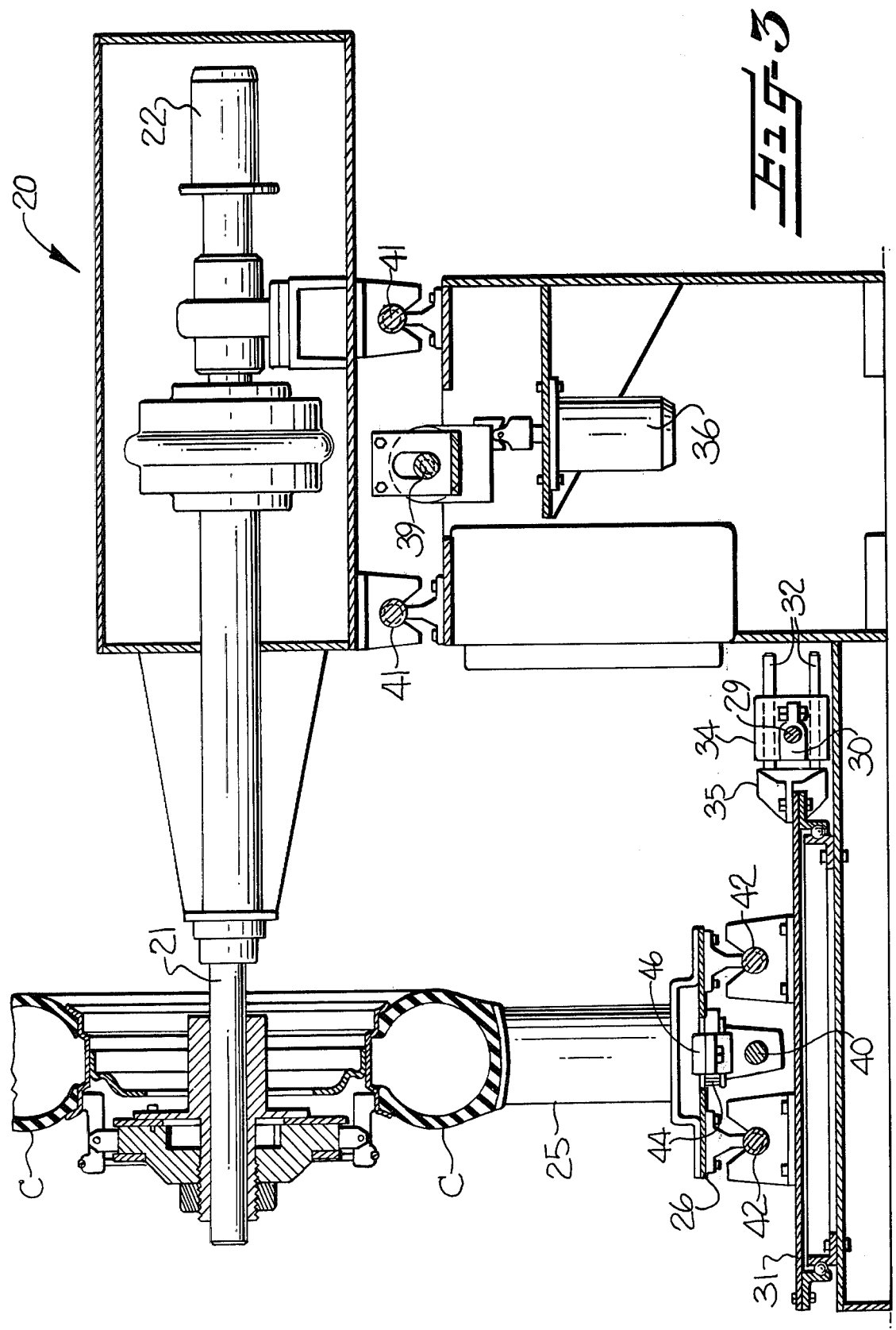
FIG. 3 is an elevation view, partially in section, through a portion of the apparatus of FIG. 1 and taken generally along one specific axis of tire movement.

By means of a similar stepping motors 36, 38 (FIGS. 3 and 1) and screws 39, 40 driven thereby, the tire mounting means including the shaft 21 and the base plate 26 may be moved along supporting ways respectively generally indicated at 41 and 42. Such movement controls the relative position of the tire and any selected at one of the knives K0 through K7 along an axis herein referred to as the Z axis. Movement along the Z axis governs the depth of any specific groove being formed.

Means are provided for positioning the turret 24 in such a manner as to present a selected one knife for use. In particular, the turret positioning means comprises a spur gear 44 (FIGS. 11 through 18) mounted beneath the standard 25 and engaged by a rack 45. The rack 45 is positioned by a series of pneumatic cylinders, identified as 46, 47, 48. By means of controlled actuation of the cylinders, eight different rotational positions for the turret means 24 are achieved. The sequence of actuation and positions is illustrated in FIGS. 11 through 18. For example, rotational position 0, disposed knife K0 for engagement with the tire surface, by movement of pistons within the cylinders 46, 47, 48 toward the right (FIG. 11). In order to move knife K1 into the operating position, the turret means 24 is moved to position 2 by shifting the piston of one cylinder 46 leftward (FIG. 12). The strokes of the respective cylinders 46, 47, 48 are such that one cylinder 46 has a stroke sufficient to rotate the turret means 24 one operating position. A second cylinder, namely cylinder 47, is sufficient to move the turret means 24 two positions. The third cylinder 48 has a stroke sufficient to move the turret means 24 four positions. By selecting various combinations of the cylinders for shifting leftward, any one of the eight knives may be brought into the operating position for engagement with the tire carcass C. Actuation of the pneumatic cylinders 46, 47, 48 is under the control of suitable solenoid actuated valves 50, 51, 52.

The turret means 24 additionally includes provision for rotating the knives K0 through K7 and for controlling heating of the knives K0 through K7. Atop the standard 25 is a stepping motor 54 which acts vertically to move a control plate 55. The control plate 55 carries a plurality of racks 58, one corresponding to each knive K0 through K7. Each of the racks 58 engages a corresponding pinion gear, one of which is shown at 59 in FIG. 9. Each pinion gear 59 is coupled to a shaft on which the corresponding knife is mounted, and, upon vertical movement of the control plate 55, rotates the corresponding knife about a corresponding axis T to any desired angle with respect to the tread surface of the tire. Blade heating is controlled in the form illustrated, by a corresponding series of SCR devices 60 through 67. Additionally, a locking cylinder 68 (FIG. 8) locks the turret means 24 into a selected rotational position so as to assure stability of a knife being used.

In operation, a tire into which a grooved tread design is to be formed is mounted upon the tire mounting means of the apparatus in accordance with this invention and a selected one knife, for example knife K1, is brought into position against the tread rubber which has been applied to the tire carcass. Knife contact can be determined visually by an operator or through means of an appropriate light source detector sensing arrangement. If not previously done, a specific tread design program is selected from a plurality of patterns stored in a programmable memory. Operation of the apparatus, and the sequence of the method of this invention, are then initiated. Under the control of the pattern stored in the programmable memory, the stepping motors 22, 36, 38, 54 are incremented through particular pulse patterns to move a knife into position for engagement with the tread rubber on the tire and through a particular path of movement for grooving the tread rubber. From time to time, under the control of the pattern stored in the programmable memory, a selected knife may be withdrawn by movement on the various identified X, Y and Z axes, the turret means 24 rotated to bring another knife into position, and the newly selected knife moved into position for engagement with the tread rubber on the tire. The selected knife then in engagement with the surface of the tire may be rotated about the axes of rotation of the knife through operation of the knife rotating stepping motor 54 in order to assure ease of movement of the selected one knife through the tread rubber materials, and is heated by energization of the corresponding SCR device.

Figure 4:
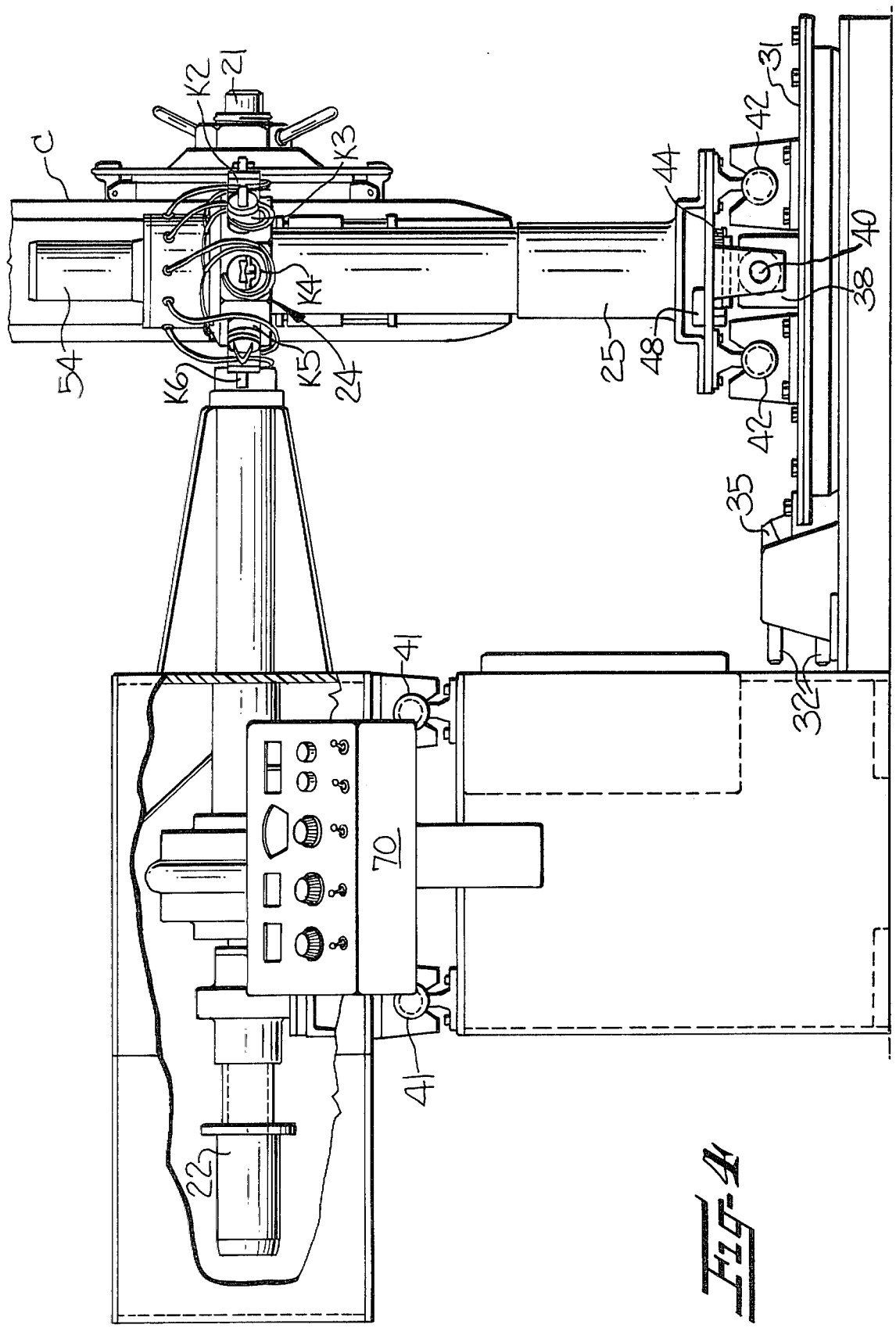
FIG. 4 is an elevation view, partly broken away, taken from a direction opposite to the view of FIG. 3.

Control of the method of the present invention, and operation of the apparatus described hereinabove, is accomplished through use of a programmable memory means as briefly mentioned above. Preferably, the programmable memory means takes the form of a microprocessor such as an 8080 mounted in a control housing 70 (FIG. 4). The microprocessor present at the apparatus 20 may be supplied with programs for formation of tread designs from a data cassette magnetic tape recording. Programs may be developed for such a data cassette using other computer facilities, with the function of the programmable memory means at the apparatus 20 being that of selecting a specific tread design program from the library provided by the data cassette and then forming a tread design in a tire in accordance with the selected program. As will be appreciated, an operator of the apparatus 20 may identify, by appropriate input switches and the like, the specific program to be selected from the library provided by the data cassette. Once a specific program has been selected and loaded into the programmable memory controlled by the microprocessor, formation of a tread design as indicated above may begin and continue.

It is believed likely that persons appropriately skilled in the arts of applying microprocessors will be enabled, by the disclosure given hereinabove, to design programs which would control the operation of the apparatus described in such a manner as to produce a desired tread design. However, as an aid in the design of such programs, a portion of a rib design program used with an operating embodiment of the apparatus described will be reproduced hereinbelow, as follows:

```
 5
X 5500 50 −           RIGHT
T  294 50 +           CCW
R 1
N
10
K 1
H 7
R 1
N
15
Z  400 50 +           IN
R 1
N
20
X 2800 53 +           LEFT
Y 3491 42 −           DOWN
N
25
X  260 100 +          LEFT
T  196 100 +          CCW
Z  100 100 −          OUT
N
30
X 1000 100 +          LEFT
Y 1342  74 +          UP
Z  100 100 +          IN
N
35
X  260 100 +          LEFT
T  196 100 −          CW
N
40
X  650 100 +          LEFT
Y  872  74 −          DOWN
Z  650 100 −          OUT
N
45
X 4970 40 −           RIGHT
Y  308 40 −           DOWN
N
50
Z  650 50 +           IN
R 48
N
55
```

Program listing references to the X, Y and Z axes will be relatively clear. Program references to a T axis refer to the rotational heading of a knife, accomplished through stepping of the stepping motor 54 atop the turret 24. With respect to each stepping motor drive, the program line calls for a specific stepping motor, specifies a distance to be moved by a number of pulses, specifies the velocity at which the movement is to occur, and specifies the direction of movement by a plus or minus. Additional programs indicate the blade to be selected, such as "K1", indicate that the blade is to be heated by an indicator H, specify a number of repetitions of the particular step, such as R48, and call for the next line number, by a reference N. The portion of a program listing here repeated begins the formation of a rib tread design for a truck tire or the like by forming jogged or angled cuts from one side edge portion of the crown surface of a tire.

In the drawings and specification, there has been set forth a preferred embodiment of the invention, and although specific terms are employed, they are used in a generic and descriptive sense only and not for purposes of limitation.

That which is claimed is:

1. In an apparatus for forming a predetermined grooved tread design in tread rubber applied to a tire, said apparatus including tire mounting means for supporting a tire for rotation about a predetermined axis, knife means for forming grooves in tread rubber previously applied to the tire, means mounting said knife means for relative movement between said knife means and the tread surface of the tire, and programmable memory means for controlling relative movement between said knife means and said tire mounting means to form grooves in the tread surface of the tire and of any selected one of a plurality of different configurations, the improvement in said means mounting said knife means comprising turret means for mounting a plurality of knives of a plurality of configurations for forming a corresponding plurality of configurations of grooves, and drive means operatively connected with and responsive to said programmable memory means for moving a selected one of said plurality of knives into engagement with the tread surface of a tire and along a predetermined path through tread rubber applied thereto.

2. Apparatus according to claim 1 wherein said drive means comprises a plurality of stepping motors each operatively connected with and addressable by said programmable memory means for moving corresponding portions of said apparatus for programmed distances and at programmed velocities and in programmed directions.

3. Apparatus according to claim 2 wherein said stepping motors include a tire rotation drive motor for rotating a tire about said predetermined axis.

4. Apparatus according to claim 2 wherein said stepping motors include a knife translation drive motor for traversing a selected knife in a direction across the tread surface of the tire.

5. Apparatus according to claim 2 wherein said stepping motors include a depth of cut drive motor for moving the selected one knife toward and away from said predetermined axis of tire rotation for controlling the depth of the groove formed thereby.

6. Apparatus according to claim 2 wherein said stepping motors include a knife attitude drive motor for rotating the selected one of said plurality of knives about an axis generally perpendicular to said predetermined axis of tire rotation for controlling the angulation of the knife with respect to the path of relative movement between the knife and the tread surface.

7. Apparatus according to claim 1 further comprising base plate means mounted in predetermined relation relative to said tire mounting means for supporting said turret means, elongate standard means rising from said base plate means along a generally vertical axis substantially perpendicular to said predetermined axis of tire rotation, and further wherein said turret means comprises a turret block mounted on said standard means for rotation about said generally vertical axis.

8. Apparatus according to claim 7 wherein said turret means further comprises a plurality of knife blocks each mounted in said turret block for rotation about a corresponding generally horizontal axis and each supporting a corresponding one of said plurality of knives, said knife blocks being rotatable about said corresponding horizontal axes for positioning corresponding knives with respect to a direction of relative movement between the knife and the tread surface of the tire.

9. Apparatus according to claim 1 further comprising turret drive means operatively connected with and addressable by said programmable memory means for moving said turret means and for positioning said selected one knife for engagement with the tread surface of the tire.

10. In an apparatus for forming a predetermined grooved tread design in tread rubber applied to a tire, said apparatus including tire mounting means for supporting a tire for rotation about a predetermined axis, knife means for forming grooves in tread rubber previously applied to the tire, means mounting said knife means for relative movement between said knife means and said tire mounting means to form grooves in the tread surface of the tire and of any selected one of a plurality of different configurations, the improvement in said means mounting said knife means comprising base plate means mounted in predetermined relation relative to said tire mounting means, elongate standard means rising from said base plate means along a generally vertical axis substantially perpendicular to said predetermined axis of tire rotation, a turret block mounted on said standard means for rotation about said generally vertical axis and mounting a plurality of knives of a plurality of configurations for forming a corresponding plurality of configurations of grooves, and a plurality of stepping motors each operatively connected with and addressable by said programmable memory means for moving corresponding portions of said apparatus for programmed distances and at programmed velocities and in programmed directions and thereby for moving a selected one of said plurality of knives into engagement with the tread surface of a tire and along a predetermined path through tread rubber applied thereto.

11. In a method of forming a grooved tread design in a tire which has had tread rubber applied thereto and which is mounted for rotation about its own axis, the method including the steps of forming grooves in the tread rubber on the tire by moving a heated knife relative to the tread surface of the tire in accordance with a pattern stored in a programmable memory, an improvement comprising selecting one of a plurality of knives of varying configurations in accordance with a pattern stored in the programmable memory and moving the selected knife into position for engagement with the tread rubber on the tire.

12. A method according to claim 11 further comprising moving a selected knife and the tread surface of the tire relative to one another in three axes while forming grooves in accordance with the pattern stored in the programmable memory.

13. A method according to one of claims 11 or 12 further comprising moving a selected knife and the tread surface of the tire relative to one another for programmed distances and of programmed velocities and in programmed directions.

* * * * *